(12) United States Patent
Vestergaard et al.

(10) Patent No.: US 8,300,885 B2
(45) Date of Patent: Oct. 30, 2012

(54) METHODS FOR WATERMARKING MEDIA DATA

(75) Inventors: Steven Erik Vestergaard, Vancouver (CA); Che-Wai Tsui, Coquitlam (CA)

(73) Assignee: Destiny Software Productions Inc., Vancouver, Brisith Columbia (CA)

( * ) Notice: Subject to any disclaimer, the term of this patent is extended or adjusted under 35 U.S.C. 154(b) by 0 days.

(21) Appl. No.: 13/166,684

(22) Filed: Jun. 22, 2011

(65) Prior Publication Data

US 2011/0258705 A1    Oct. 20, 2011

Related U.S. Application Data

(63) Continuation of application No. 11/874,839, filed on Oct. 18, 2007, now Pat. No. 7,983,441.

(60) Provisional application No. 60/862,029, filed on Oct. 18, 2006.

(51) Int. Cl.
*G06K 9/00* (2006.01)

(52) U.S. Cl. ............. 382/100; 704/200.1; 704/500

(58) Field of Classification Search .............. 382/100
See application file for complete search history.

(56) References Cited

U.S. PATENT DOCUMENTS

| | | | |
|---|---|---|---|
| 5,613,004 | A | 3/1997 | Cooperman et al. |
| 5,687,236 | A | 11/1997 | Moskowitz et al. |
| 5,889,868 | A | 3/1999 | Moskowitz et al. |
| 6,005,643 | A | 12/1999 | Morimoto et al. |
| 6,061,793 | A | 5/2000 | Tewfik et al. |
| 6,078,664 | A | 6/2000 | Moskowitz et al. |

(Continued)

FOREIGN PATENT DOCUMENTS

WO      9802864      1/1998

(Continued)

OTHER PUBLICATIONS

Lie et al., "Robust and High-Quality Time-Domain Audio Watermarking Based on Low-Frequency Amplitude Modification", from IEEE Transactions on Multimedia, vol. 8, No. 1, Feb. 2006.

(Continued)

*Primary Examiner* — Hadi Akhavannik

(74) *Attorney, Agent, or Firm* — Oyen Wiggs Green & Mutala LLP

(57) ABSTRACT

Methods are provided for encoding watermark information into media data containing a series of digital samples in a sample domain. The method involves: dividing the series of digital samples into a plurality of sections in the sample domain, each section comprising a corresponding plurality of samples; processing the corresponding plurality of samples in each section to obtain a single energy value associated with each section; grouping the sections into groups, each group containing three or more sections; assigning a nominal bit value to each group according to a bit assignment rule, the bit assignment rule based on the energy values of the sections in the group; and assigning a watermark bit value to each group. The methods also involve, for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group. The bit assignment rule may comprise: a categorization rule for categorizing each group into one of a plurality of categories; and for each category, a unique category bit assignment rule for assigning a nominal zero bit value or a nominal one bit value to each group.

43 Claims, 7 Drawing Sheets

U.S. PATENT DOCUMENTS

| | | | |
|---|---|---|---|
| 6,385,329 | B1 | 5/2002 | Sharma et al. |
| 6,430,301 | B1 | 8/2002 | Petrovic |
| 6,507,299 | B1 | 1/2003 | Nuijten |
| 6,522,767 | B1 | 2/2003 | Moskowitz et al. |
| 6,526,510 | B1 | 2/2003 | Kori et al. |
| 6,571,144 | B1 | 5/2003 | Moses et al. |
| 6,674,861 | B1 | 1/2004 | Xu et al. |
| 6,674,876 | B1 | 1/2004 | Hannigan et al. |
| 6,690,812 | B2 | 2/2004 | Reefman et al. |
| 6,718,047 | B2 | 4/2004 | Rhoads |
| 6,737,957 | B1 | 5/2004 | Petrovic et al. |
| 6,738,744 | B2 | 5/2004 | Kirovski et al. |
| 6,741,722 | B2 | 5/2004 | Abe |
| 6,778,678 | B1 | 8/2004 | Podilchuk et al. |
| 6,839,673 | B1 | 1/2005 | Choi et al. |
| 6,891,958 | B2 | 5/2005 | Kirovski et al. |
| 6,952,774 | B1 | 10/2005 | Kirovski et al. |
| 6,975,992 | B2 | 12/2005 | Tucker et al. |
| 6,983,057 | B1 | 1/2006 | Ho et al. |
| 6,988,201 | B1 | 1/2006 | Xu et al. |
| 6,993,133 | B1 | 1/2006 | Nonomura et al. |
| 7,054,463 | B2 | 5/2006 | Rhoads et al. |
| 7,062,069 | B2 | 6/2006 | Rhoads |
| 7,073,065 | B2 | 7/2006 | Stone |
| 7,085,396 | B2 | 8/2006 | Pelly et al. |
| 7,095,874 | B2 | 8/2006 | Moskowitz et al. |
| 7,106,862 | B1 | 9/2006 | Blair et al. |
| 7,107,451 | B2 | 9/2006 | Moskowitz |
| 7,113,614 | B2 | 9/2006 | Rhoads |
| 7,140,043 | B2 | 11/2006 | Choi et al. |
| 7,152,162 | B2 | 12/2006 | Moskowitz et al. |
| 7,171,016 | B1 | 1/2007 | Rhoads |
| 7,197,368 | B2 | 3/2007 | Kirovski et al. |
| 7,206,649 | B2 | 4/2007 | Kirovski et al. |
| 7,224,799 | B2 | 5/2007 | Mase |
| 7,266,697 | B2 | 9/2007 | Kirovski et al. |
| 7,269,734 | B1 | 9/2007 | Johnson et al. |
| 7,277,871 | B2 | 10/2007 | Suzuki et al. |
| 7,299,189 | B1 | 11/2007 | Sato |
| 7,324,159 | B2 | 1/2008 | Eveleens et al. |
| 7,325,131 | B2 | 1/2008 | Reefman |
| 7,395,211 | B2 | 7/2008 | Watson et al. |
| 2004/0024588 | A1 | 2/2004 | Watson et al. |
| 2004/0028222 | A1 | 2/2004 | Sewell et al. |
| 2004/0120523 | A1 | 6/2004 | Haitsma et al. |
| 2005/0105726 | A1 | 5/2005 | Neubauer et al. |
| 2005/0108542 | A1 | 5/2005 | Kirovski et al. |
| 2005/0177727 | A1 | 8/2005 | Moskowitz et al. |

FOREIGN PATENT DOCUMENTS

| | | |
|---|---|---|
| WO | 03052598 | 6/2003 |
| WO | 2004066206 | 8/2004 |

OTHER PUBLICATIONS

Boney et al., "Digital Watermarks for Audio Signals", in Proc. 3rd IEEE Int. Conf. Multimedia Computing and Systems, 1996, pp. 473-480.

Gruhl et al., "Echo Hiding", Berlin, Germany, Springer, 1996, vol. 1174, Lecture Notes in Computer Science, Information Hiding, pp. 295-315.

Bassia et al., "Robust Audio Watermarking in the Time Domain", IEEE Trans. Multimedia, vol. 3, No. 2, pp. 232-241, Jun. 2001.

Ikeda, et al., "Audio Data Hiding by Use of Band-Limited Random Sequences", in Proc. IEEE Int. Conf. Acoustics, Speech and Signal Processing, vol. 4, 1999, pp. 2315-2318.

Xu et al., "A Robust Digital Audio Watermarking Technique", in Proc. 5th Int. Symp. Signal Processing and its Application, vol. 1, 1999, pp. 95-98.

Xu et al., "Application of Digital Watermarking Technology in Audio Signals", J. Audio Eng. Soc., vol. 47, pp. 805-812, 1999.

Neubauer, et al., "Continuous Steganographic Data Transmission Using Uncompressed Audio", Proc. 2nd Int. Workshop on Information Hiding, 1998, pp. 208-217.

Ciloglu et al., "An Improved All-Pass Watermarking Scheme for Speech and Audio", in Proc. IEEE Int. Conf. Multimedia and Exposition (ICME), 2000, pp. 1017-1020.

Kim, H., "Stochastic Model Based Audio Watermark and Whitening Filter for Improved Detection", in proc. IEEE Conf. Acoustics, Speech and Signal Processing (ICASSP), 2000, pp. 1971-1974.

Swanson et al., "Robust Audio Watermarking Using Perceptual Masking", Signal Process., vol. 66, pp. 337-355, 1998.

Wang, Xin, "An Audio Watermarking Scheme in Time-Domain", ELG 7173 Topics in Signal Processing II (Digital Watermarking), www.discover.uottawa.ca, University of Ottawa, Nov. 15, 2006.

Wang, Xin, "An Audio Watermarking Scheme in Time-Domain", ELG 7173 Topics in Signal Processing II (Digital Watermarking)—Final Project, www.discover uottawa.ca, University of Ottawa, Dec. 4, 2006.

Bassia et al., "Robust Audio Watermarking in the Time Domain", Proceedings of EUSIPCO (1998).

PCT International Search Report dated Feb. 14, 2008 from the International Searching Authority, Canadian Intellectual Property Office, PCT/CA2007/001821, International Filing Date Oct. 18, 2007.

METHODS FOR WATERMARKING MEDIA DATA

RELATED APPLICATIONS

This application claims the benefit of the priority date of U.S. application No. 60/862,029 filed 18 Oct. 2006 which is hereby incorporated herein by reference. This application is a continuation of U.S. patent application Ser. No. 11/874,839 filed 18 Oct. 2007.

TECHNICAL FIELD

The invention relates to watermarking media data. Particular embodiments of the invention provide methods for embedding watermarks into media data and/or extracting watermarks from media data.

BACKGROUND

Watermarking media data (e.g. media files and/or media signals) generally involves embedding or otherwise adding information to the media data (i.e. "marking" the media data). In many applications, it is preferable that the information embedded in the media data does not substantially alter the human perception of playback of the media content. A watermark may generally comprise any information, such as, for example: encryption keys, authentication information, indications of ownership, indications of user ID or the like.

In the example of audio media data, watermarking processes typically exploit the human audio perception's inability to detect slight changes in the playback of audio content. When a watermark is embedded into audio data, it is generally desirable that when the audio data is played back, it is difficult for a human to perceive differences between playback of the watermarked audio content and playback of the original non-watermarked audio content.

It is generally desirable that, once embedded, a watermark be relatively robust to manipulation of the resultant watermarked media data. By way of non-limiting examples, it is desirable that the watermark be recoverable after: compression of the watermarked data; addition of noise to the watermarked data; D/A and A/D conversion of the watermarked data; resampling of the watermarked data; filtering of the watermarked data; changing the volume of the watermarked data; and/or other manipulation of the watermarked data.

It is also generally desirable that it be relatively difficult to filter or otherwise remove the watermarking from the watermarked media data without significantly degrading the playback quality of the media content.

Prior art watermarking techniques have yet to achieve some or all of the aforementioned desirable characteristics to a level sufficient to gain widespread commercial acceptance.

SUMMARY

One aspect of the present invention provides a method for encoding watermark information into media data containing a series of digital samples in a sample domain. The method comprises: dividing the series of digital samples into a plurality of sections in the sample domain, each section comprising a corresponding plurality of samples; processing the corresponding plurality of samples in each section to obtain a single energy value associated with each section; grouping the sections into groups, each group containing three or more sections; assigning a nominal bit value to each group according to a bit assignment rule, the bit assignment rule based on the energy values of the sections in the group; assigning a watermark bit value to each group; and for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group.

Assigning the nominal bit value to each group according to the bit assignment rule may comprise: categorizing each group into one of a plurality of categories according to a categorization rule; and, for each category, assigning a nominal zero bit value or a nominal one bit value to each group according to a unique category bit assignment rule associated with the category.

Another aspect of the invention provides a method for extracting watermark information from media data containing a series of digital samples in a sample domain. The method comprises: dividing the series of digital samples into a plurality of sections in the sample domain, each section comprising a corresponding plurality of samples; processing the corresponding plurality of samples in each section to obtain a single energy value associated with each section; grouping the sections into groups, each group containing three or more sections; assigning a nominal bit value to each group according to a bit assignment rule, the bit assignment rule based on the energy values of the sections in the group. Assigning the nominal bit value to each group according to the bit assignment rule may comprise: categorizing each group into one of a plurality of categories according to a categorization rule; and, for each category, assigning a nominal zero bit value or a nominal one bit value to each group according to a unique category bit assignment rule associated with the category.

Other aspects and features of specific embodiments of the invention are described in more detail below.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Particular embodiments of the invention provide methods for watermarking media data which involve minor modification of the relative energy the media data samples. The watermarking techniques of the invention may generally be applied to a variety of types of media data, including, by way of non-limiting example, audio data, image data and video data. For the purposes of illustrating particular exemplary embodiments of the invention, the following description describes methods for watermarking audio data and then describes how these techniques can be modified for watermarking other types of media data.

Audio Data

Figure 1:
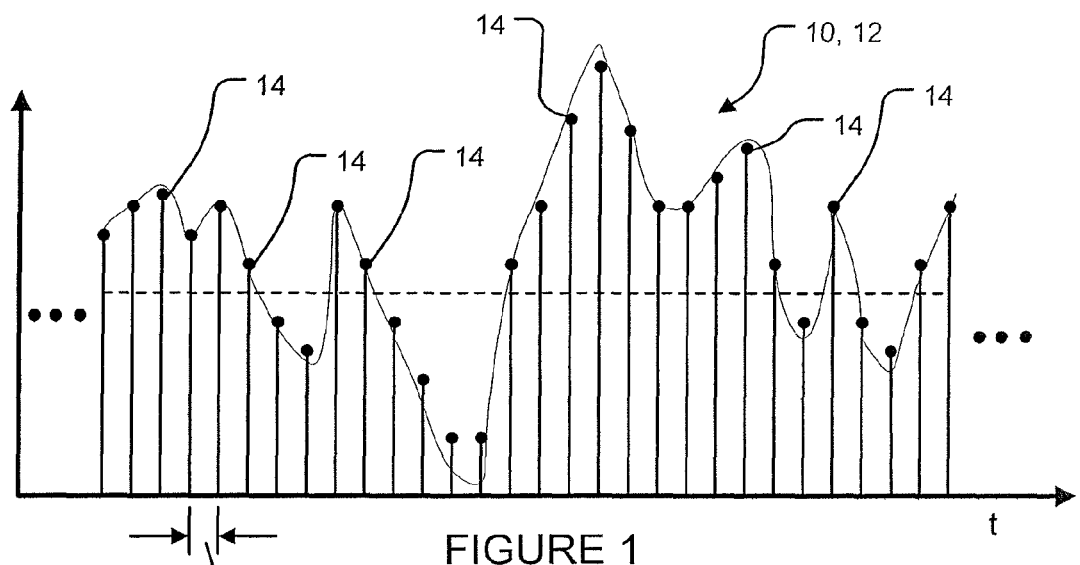
FIG. 1 is a schematic depiction of digital audio data which may be watermarked in accordance with the invention.

FIG. 1 schematically depicts a segment of typical digital audio data 10 which comprises a series 12 of samples 14 in the time domain t. Samples 15 may comprise pulse-code modulation (PCM) samples, for example. This is not necessary, however, and the invention could be practiced using other sampling schemes. Samples 14 are spaced from one another by a sampling period $T_s$ which defines a corresponding sampling frequency $f_s$. In the particular case of CD audio, the sampling frequency $f_s$ is typically 44.1 kHz, although the invention should be understood to incorporate digital audio data 10 having any suitable sampling frequency $f_s$. Samples 14 may be digitally quantized in a binary scheme. By way of non-limiting example, CD audio currently uses a 16-bit resolution for each sample 14.

Audio data 10 may be maintained in a suitable file (not shown), which facilitates storage, transmission, processing and the like of audio data 10. Those familiar with audio technology will appreciate that digital audio data 10 of FIG. 1 may represent one audio channel and that a plurality of channels may be combined (e.g. by time division multiplexing (TDM) or any other suitable technique) to form multi-channel audio data 10. In such cases, it will be assumed for the purposes of the description below that the sampling period $T_s$ and the sampling frequency $f_s$ are characteristics of the multi-channel audio data 10. In such cases, the watermarking methods described below may be performed on multi-channel audio data 10. In other embodiments, the watermarking methods described below could be applies separately to each channel and then the channels may be subsequently multiplexed.

Embedding a Watermark

Figure 2:
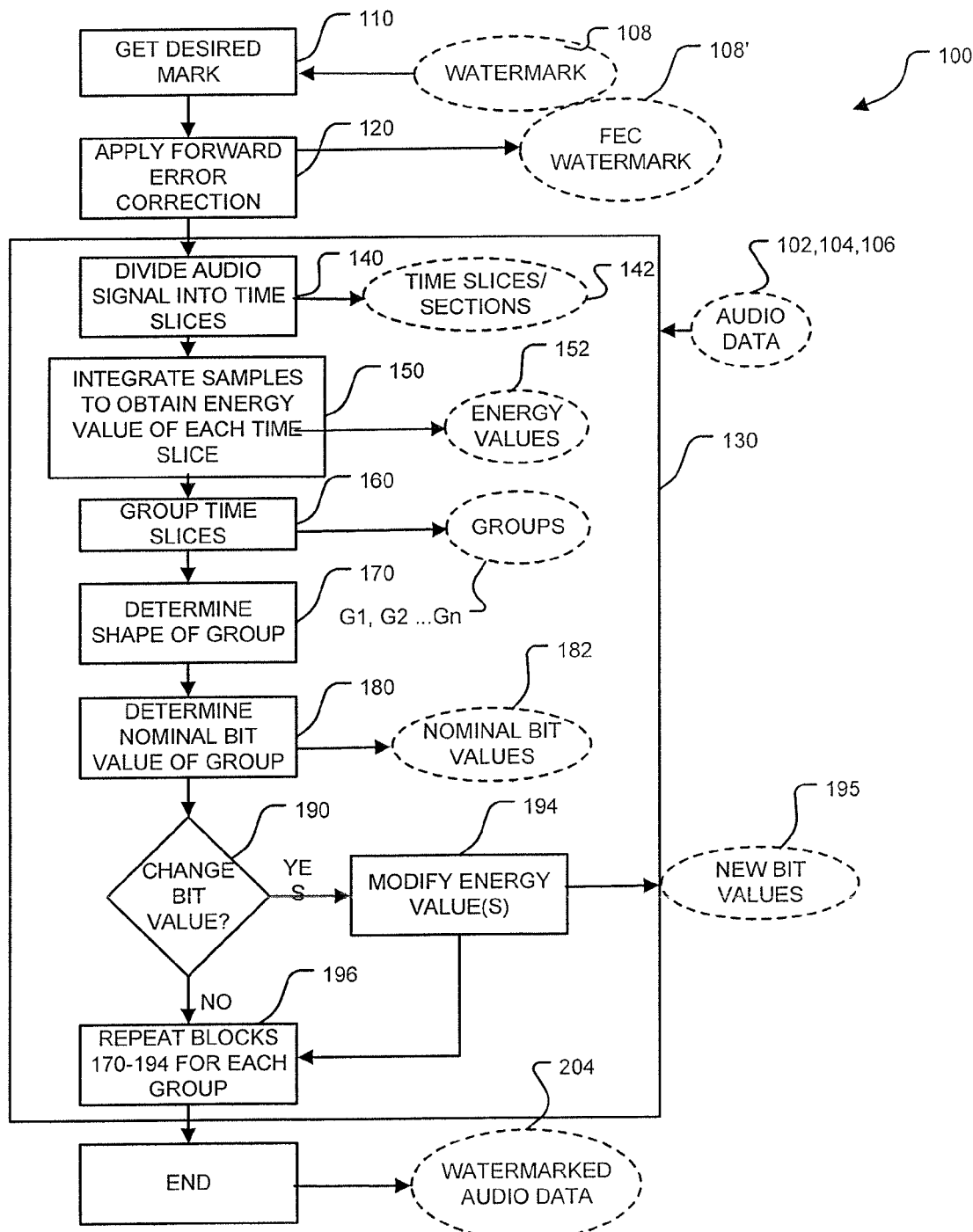
FIG. 2 depicts a method for embedding watermark data into a media file in accordance with a particular embodiment of the invention.

FIG. 2 schematically depicts a method 100 for embedding a watermark 108 into media data 102 in accordance with a particular embodiment of the invention. In the exemplary embodiment of FIG. 2, media data 102 comprises audio data 104. Audio data 104 may be provided in the form of an audio file 106. Audio data 104 may have the characteristics described above, including a sampling period $T_s$ and a sampling frequency $f_s$. Audio data 104 may comprise multi-channel audio data or single channel audio data. In some embodiments, audio file 106 may comprise additional data (e.g. metadata) in addition to audio data 104.

Method 100 commences in block 110 which involves obtaining the desired watermark data 108. In one particular embodiment, watermark data 108 comprises 32 bits of information, although watermark data 108 may generally comprise a different number of bits. Watermark data 108 could generally comprise any data. By way of non-limiting example, watermark data 108 may comprise user ID information, encryption keys, authentication information designating ownership of media data 102 or the like. In some embodiments, watermark data 108 could be encrypted (e.g. using one or more encryption keys and/or pseudo randomization processes). A variety of suitable encryption techniques are known in the art.

Method 100 then proceeds to block 120, where watermark data 108 is expanded using one or more forward error correction (FEC) encoding schemes to provide FEC watermark data 108'. In some embodiments, the block 120 forward error correction encoding scheme is based on Low-Density Parity-Check (LDPC) codes, although other error correction encoding techniques may additionally or alternatively be used. In one particular embodiment of the invention, block 120 involves expanding the 32 bit watermark data 108 using forward LDPC error correction to FEC watermark data 108' of 600 bits—i.e. a redundancy factor of more than 15 times. As discussed further below, a redundancy factor of this magnitude permits watermark data 108 to be recovered even if up to ⅓ of the bits of FEC watermark data 108' are corrupted.

Method 100 then proceeds to block 130, where FEC watermark data 108' is embedded into audio data 104.

Figure 3:
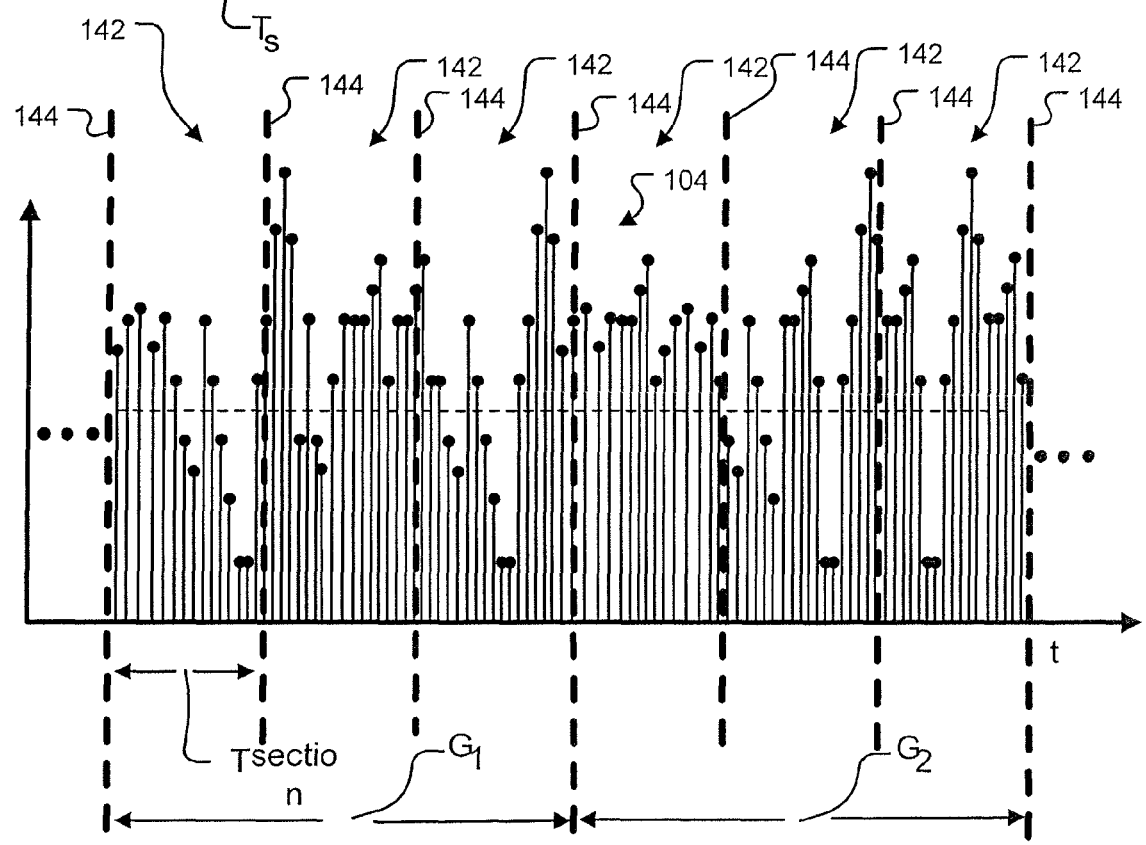
FIG. 3 shows how media data is divided into sections/time slices containing a plurality of samples and how the sections/time slices are grouped into groups.

In the illustrated embodiment, the block 130 watermark embedding procedure starts in block 140, where time-domain digital audio data 104 is parsed into a number of sections 142. This block 140 sectioning process is shown schematically in FIG. 3 for a portion of audio data 104, where sections 142 are demarcated by lines 144. In the exemplary embodiment, where media data 102 comprises audio data 104 and audio data 104 comprises a series of samples in the time domain (see FIG. 1), the block 140 sections 142 may be referred to as time slices 142. Each time slice 142 may comprise a plurality of samples of audio data 104. As shown in FIG. 3, sections 142 may have equal numbers of samples—e.g. time slices 142 may have equal durations. For example, in some embodiments, each time slice 142 may have duration $t_{section}$ of ~5-100 ms and may comprise ~10-1000 samples. The duration of time slices 142 and/or the number of samples in each time slice 142 may vary as between implementations of method 100. For example, where audio data 104 comprises a short audio clip, it may be desirable to have relatively small time slices 142 to ensure that a sufficient number of the bits of FEC watermark 108' can be embedded into audio data 104. Conversely, if audio data 104 is two hours long, time slices 142 may be relatively large while still enabling a sufficient number of time slices 142 to encode a desired number of bits of FEC watermark 108'.

In block 150, the samples in each time slice 142 are integrated to obtain a single value 152 for each time slice 142. In one particular embodiment, the block 150 integration comprises adding the values of the samples of audio data 104 in each corresponding time slice 142. The value 152 obtained from the block 150 integration may represent the energy associated with audio data 104 for each associated time slice 142 and may be referred to herein as the energy value 152 of the associated time slice 142. Since time slices 142 are the same length, each time slice 142 will have the same number of samples and each energy valus 152 will be representative of the total magnitude of the samples in its corresponding time slice 142.

Block 160 involves assembling time slices 142 and their corresponding energy values 152 into groups. This block 150 grouping process is also shown schematically in FIG. 3, which depicts groups $G_1$ and $G_2$. Depending on the length of audio data 104, the block 150 groups may comprise groups $G_1, G_2 \ldots G_n$ (referred to individually and collectively as groups G). In one particular embodiment, each group G of time slices 142 comprises three time slices 142 and three corresponding energy values 152.

Method 100 then proceeds to block 170 which involves categorizing the shapes of the energy values 152 associated with each group G of time slices 142. In the illustrated embodiment, each group G of time slices 142 comprises an ordered triplet of three energy values 152. The ordered triplet of energy values 152 comprises:

a first energy value 152A associated with a first time slice 142A;

a second energy value 152B associated with a second time slice 142B, wherein the second time slice 142B is adjacent to the first time slice 142A; and a third energy value 152C associated with a third time slice 142C, wherein the third time slice 142C is adjacent to the second time slice 142B and is spaced apart from the first time slice 142A.

Figure 4:
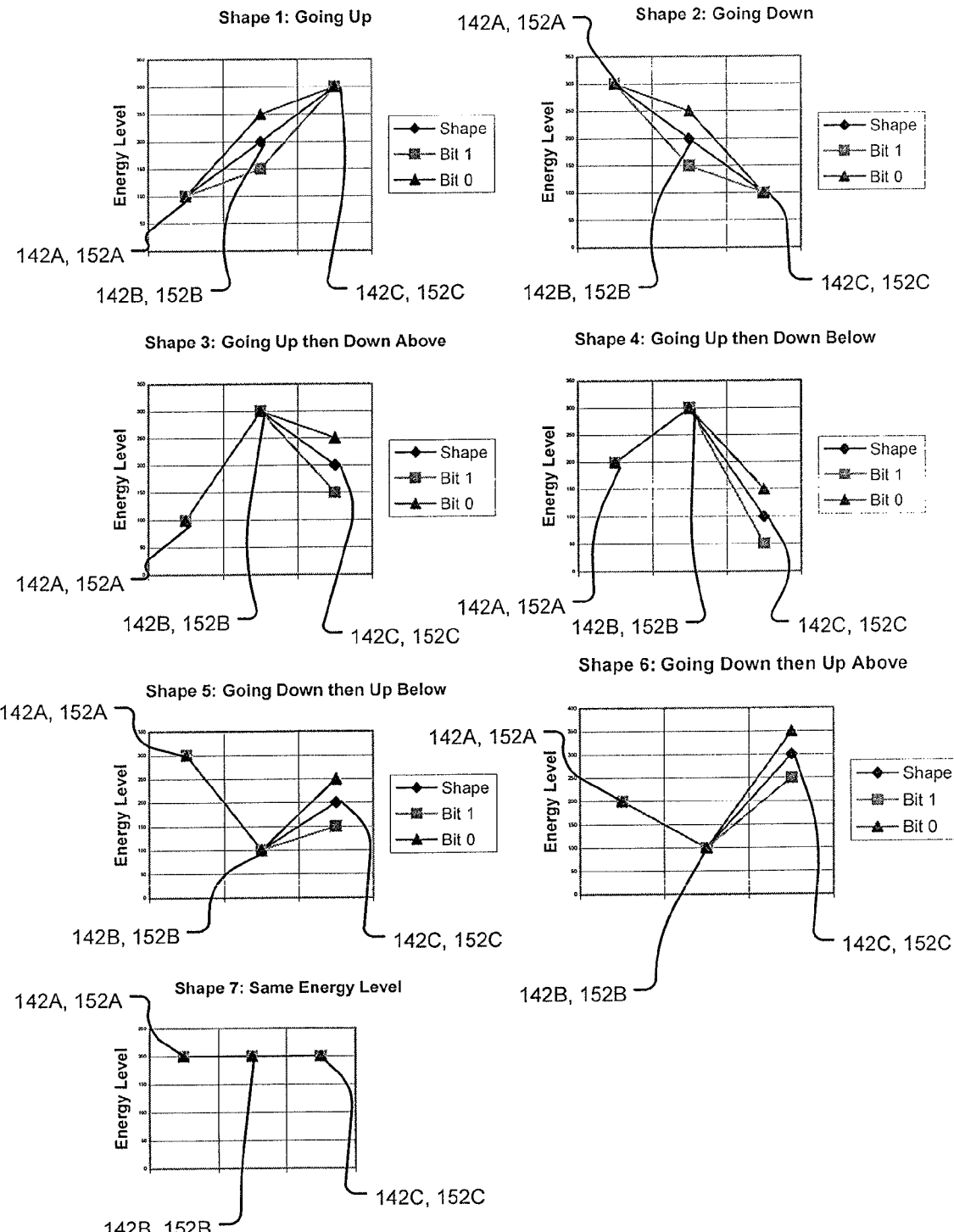
FIG. 4 depicts a number of shape categories into which the groups G may be categorized according to a particular embodiment of the invention.

Block 170 may involve categorizing each group G of time slices 142 (and its corresponding energy values 152) into one of the shape categories shown in FIG. 4.

FIG. 4 show a number of shape categories and a number of examples of groups G which fit into each category. The FIG. 4 shape categories include:

Shape 1: where second energy value 152B is greater than first energy value 152A and third energy value 152C is greater than second energy value 152B;

Shape 2: where the second energy value 152B is less than the first energy value 152A and the third energy value 152C is less than the second energy value 152B;

Shape 3: where the second energy value 152B is greater than the first energy value 152A and the third energy value 152C is between the first and second energy values 152A, 152B;

Shape 4: where the second energy value 152B is greater than the first energy value 152A and the third energy value 152C is less than the first energy value 152A;

Shape 5: where the second energy 152B value is less than the first energy value 152A and the third energy value 152C is between the first and second energy values 152A, 152B;

Shape 6: where the second energy value 152B is less than the first energy value 152A and the third energy value 152C is greater than the first energy value 152A; and Shape 7: the rare case that the first, second and third energy values 152A, 152B, 152C are the same.

The seven shape categories shown in FIG. 4 represent a range of possible shape categories where there are three time slices 142 and three corresponding energy values 152 in each group G of time slices 142. In some embodiments, the number of time slices 142 in each group G can differ. With a different number of time slices 142 in each group G, the range of possible shape categories and the rules for assigning shape categories may also differ. However, those skilled in the art will appreciate that even with a different number of time slices 142 in each group G, it is possible to create shape categories based on the relative energy values 152 of the time slices 142.

Returning to FIG. 2, method 100 proceeds to block 180 which involves determining a nominal bit value 182 for each group G of time slices 142. A nominal bit value 182 is assigned to each of the block 170 shape categories according to a bit assignment rule that may be particular to that shape category. The bit assignment rules may be based on the energy values 152 and/or the slopes between successive energy values 152A, 152B, 152C and/or functions of energy values 152 and the slopes between successive energy values 152A, 152B, 152C, for example.

FIG. 4 schematically depicts a set of bit assignment rules for the FIG. 4 shape categories according to one particular embodiment. The set of bit assignment rules associated with the seven shapes shown in FIG. 4 is:

Shape 1: if the magnitude of the slope between the first and second energy values 152A, 152B is greater than or equal to the magnitude of the slope between the second and third energy values 152B, 152C, then assign a nominal bit value 182 of 0; else if the magnitude of the slope between the first and second energy values 152A, 125B is less than the magnitude of the slope between the second and third energy values 152B, 152C, then assign a nominal bit value 182 of 1;

Shape 2: if the magnitude of the slope between the first and second energy values 152A, 152B is less than or equal to the magnitude of the slope between the second and third energy values 152B, 152C, then assign a nominal bit value 182 of 0; else if the magnitude of the slope between the first and second energy values 152A, 152B is greater than the magnitude of the slope between the second and third energy values 152B, 152C, then assign a nominal bit value 182 of 1;

Shape 3: if the magnitude of the slope between the second and third energy values 152B, 152C is less than or equal to ½ of the magnitude of the slope between the first and second energy values 152A, 152B, then assign a nominal bit value 182 of 0; else if the magnitude of the slope between the second and third energy values 152B, 152C is greater than ½ of the magnitude of the slope between the first and second energy values 152A, 152B, then assign a nominal bit value 182 of 1;

Shape 4: if the magnitude of the slope between the second and third energy values 152B, 152C is less than or equal to 2 times the magnitude of the slope between the first and second energy values 152A, 152B, then assign a nominal bit value 182 of 0; else if the magnitude of the slope between the second and third energy values 152B, 152C is greater than 2 times the magnitude of the slope between the first and second energy values 152A, 152B, then assign a nominal bit value 182 of 1;

Shape 5: if the magnitude of the slope between the second and third energy values 152B, 152C is less than or equal to ½ of the magnitude of the slope between the first and second energy values 152A, 152B, then assign a nominal bit value 182 of 1; else if the magnitude of the slope between the second and third energy values 152B, 152C is greater than ½ of the magnitude of the slope between the first and second energy values 152A, 152B, then assign a bit value 182 of 0;

Shape 6: if the magnitude of the slope between the second and third energy values 152B, 152C is less than or equal to 2 times the magnitude of the slope between the first and second energy values 152A, 152B, then assign a nominal bit value 182 of 1; else if the magnitude of the slope between the second and third energy values 152B, 152C is greater than 2 times the magnitude of the slope between the first and second energy values 152A, 152B, then assign a nominal bit value 182 of 0; and Shape 7: assign no nominal bit value 182.

In the illustrated embodiment, where the separation between the first and second energy values 152A, 152B is the same as the separation between the second and third energy values 152B, 152C, the slopes referred to in the block 180 nominal bit assignment rules may be proportional to the difference between the first and second energy values 152A, 152B and the difference between the second and third energy values 152B, 152C. This is not necessary. In some embodiments, the separation between energy values 152 used in the bit assignment rule may not be equal (e.g. where each group G contains more than three time slices 142). In such cases, slope calculations may involve division by the relative distances between energy values 152.

The above-described rules assigned to the seven shape categories shown in FIG. 4 represent only one possible set of nominal bit assignment rules. Other suitable sets of nominal bit assignment rules may be used in other embodiments of the invention. Such additional or alternative sets of nominal bit assignment rules may depend on the number of time slices 142 in each group G, for example. Such additional or alternative sets of nominal bit assignment rules may use different parameters and/or different functions to assign the nominal bit values 182, for example. Preferably, the nominal bit assignment rules include the possibility of assigning a nominal bit value 182 of 1 and a nominal bit value 182 of 0 to at least three or more shape categories.

Returning to FIG. 2, block 190 involves an inquiry into whether the block 180 nominal bit value 182 for the next group G accords with the next bit value for FEC watermark 108'. Block 190 may be carried out sequentially for each group G. If a particular group G has a nominal bit value 182 which corresponds to the bit value of FEC watermark 108' (block 190 NO output), then the energy values 152 of the particular group G need not be changed and method 100 proceeds to block 196. If, on the other hand, the particular group G has a nominal bit value 182 of 0 when it is desired to mark the group with a 1 bit value (i.e. the corresponding bit of FEC watermark 108' is a 1) or the particular group G has a nominal bit value 182 of 1 when it is desired to mark the group with a 0 bit value (i.e. the corresponding bit of FEC watermark 108' is a 0), then method 100 changes the nominal bit value 182. This latter situation corresponds to the block 190 YES output, where method 100 proceeds to block 194. Block 194 involves changing the nominal bit value 182 of the particular group G by adjusting one or more of its energy value(s) 152 in such a manner that re-application of the block 180 bit assignment rule would assign the group G a new bit value 195—i.e. the new bit value 195 that would be assigned to the group G is different than the nominal bit value 182 assigned to the group G. The new bit value 195 corresponds with the FEC watermark 108' bit value that it is desired to encode in group G.

The block 194 adjustment of the energy value(s) 152 of one or more time slices 142 may be accomplished using a variety of techniques. A number of example bit value changes and their corresponding energy value 152 change(s) are presented in FIGS. 5A-5C. The illustrated examples of FIGS. 5A-5C begin with data that is determined (in block 170) to have a shape category of shape 1 and determined (in block 180) to have a nominal bit value of 0. For the examples in FIGS. 5A-5C, it is desired to adjust one or more of the energy values 152 so as to encode a FEC watermark 108' bit value of 1 rather than the nominal bit value 182 of 0—i.e. for the examples in FIGS. 5A-5C, after the block 194 adjustment of energy values, it is desired that re-application of the block 180 bit assignment rule would assign the group G a new bit value 195 of 1.

Figure 5A:
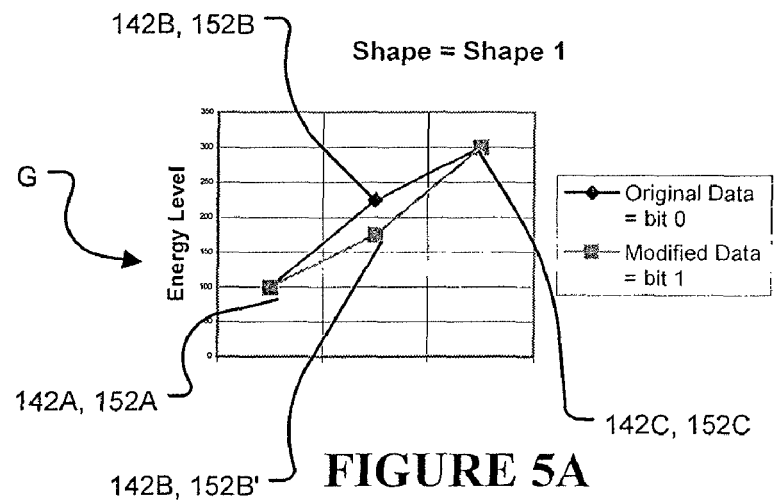
FIG. 5A-5C schematically depicts a number of methods which may be used to modify one or more energy values of a group G to change the bit value that would be assigned to the group G on re-application of the bit assignment rule.
Figure 5B:
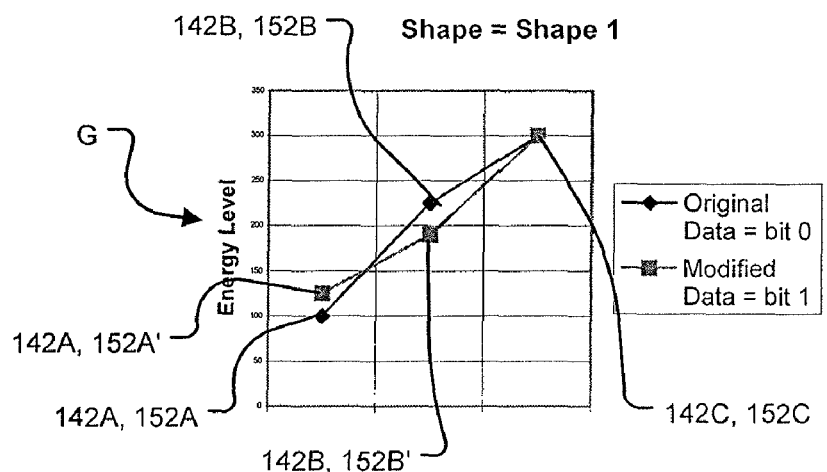
Figure 5C:
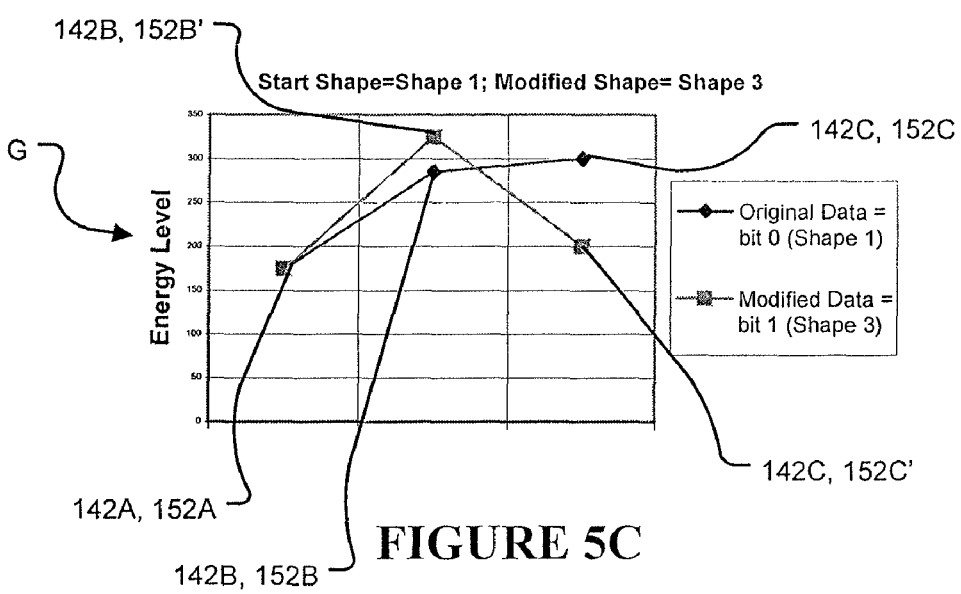

In some embodiments, the block 194 adjustment of energy value(s) 152 of one or more time slices 142 may involve adjustment of a nominal bit value 182 of 0 to a new bit value of 1 or a nominal bit value 182 of 1 to a new bit value of 0 within a particular one of the block 170 shape categories. Examples of this technique are shown in FIGS. 5A and 5B. FIG. 5A involves modifying one energy value 152 (second energy value 152B) within the group G. In the particular example of FIG. 5A, second energy value 152B is decreased from its original value 152B to a modified value 152B'. It can be seen from FIG. 5A and from the above-discussed block 180 bit assignment rule that after reducing second energy value 152B to modified value 152B', re-application of the block 180 bit assignment rule would cause the bit value assigned to the group G to change from its original nominal bit value 182 of 0 to a new bit value 195 of 1. That is, the block 194 energy value modification depicted in FIG. 5A causes a change in the bit value that would be assigned by the block 180 bit assignment rule.

FIG. 5B shows another technique for the block 194 adjustment of energy values(s) 152 which involves modifying a plurality of energy values 152 (e.g. the first and second energy values 152A, 152B in the illustrated example of FIG. 5B). In the particular example of FIG. 5B, first energy value 152A is increased from its original value 152A to a modified value 152A' and second energy value 152B is decreased from its original value 152B to a modified value 152B'. Again, it can be seen from FIG. 5B and from the above-discussed block 180 bit assignment rule that after increasing the first energy value 152A to modified value 152A' and decreasing the second energy value 152B to modified value 152B', re-application of the block 180 bit assignment rule would cause the bit value assigned to the group G to change from its original nominal bit value 182 of 0 to a new bit value 195 of 1. That is, the block 194 energy value modification depicted in FIG. 5B causes a change in the bit value that would be assigned by the block 180 bit assignment rule.

The block 194 adjustment of energy value(s) 152 may additionally or alternatively involve adjustment of a group G's nominal bit value 182 of 0 to a new value 195 of bit 1 or a group G's nominal bit value 182 of 1 to a new bit value 195 of 0 together with a corresponding change in the group G's block 170 shape category. An example of this technique is shown schematically in FIG. 5C. In the FIG. 5C example, the group G starts in the block 170 shape category 1, with a nominal bit value 182 of 0. Block 194 involves increasing second energy value 152B to modified second energy value 152B' and decreasing third energy value 152C to modified third energy value 152C'. In this manner, group G is changed such that re-application of the block 170 shape categorization process would assign the group G to a new shape category and re-application of the block 180 bit assignment rule would assign the group G a new bit value 195. In the particular example shown in FIG. 5C, after adjustment of the second and third energy values 152B, 152C to modified values 152W, 152C', re-application of the block 170 shape categorization process would assign the group G to shape category 3 and re-application of the block 180 bit assignment rule would assign the group G a new bit value 195 of 1.

Figure 8:
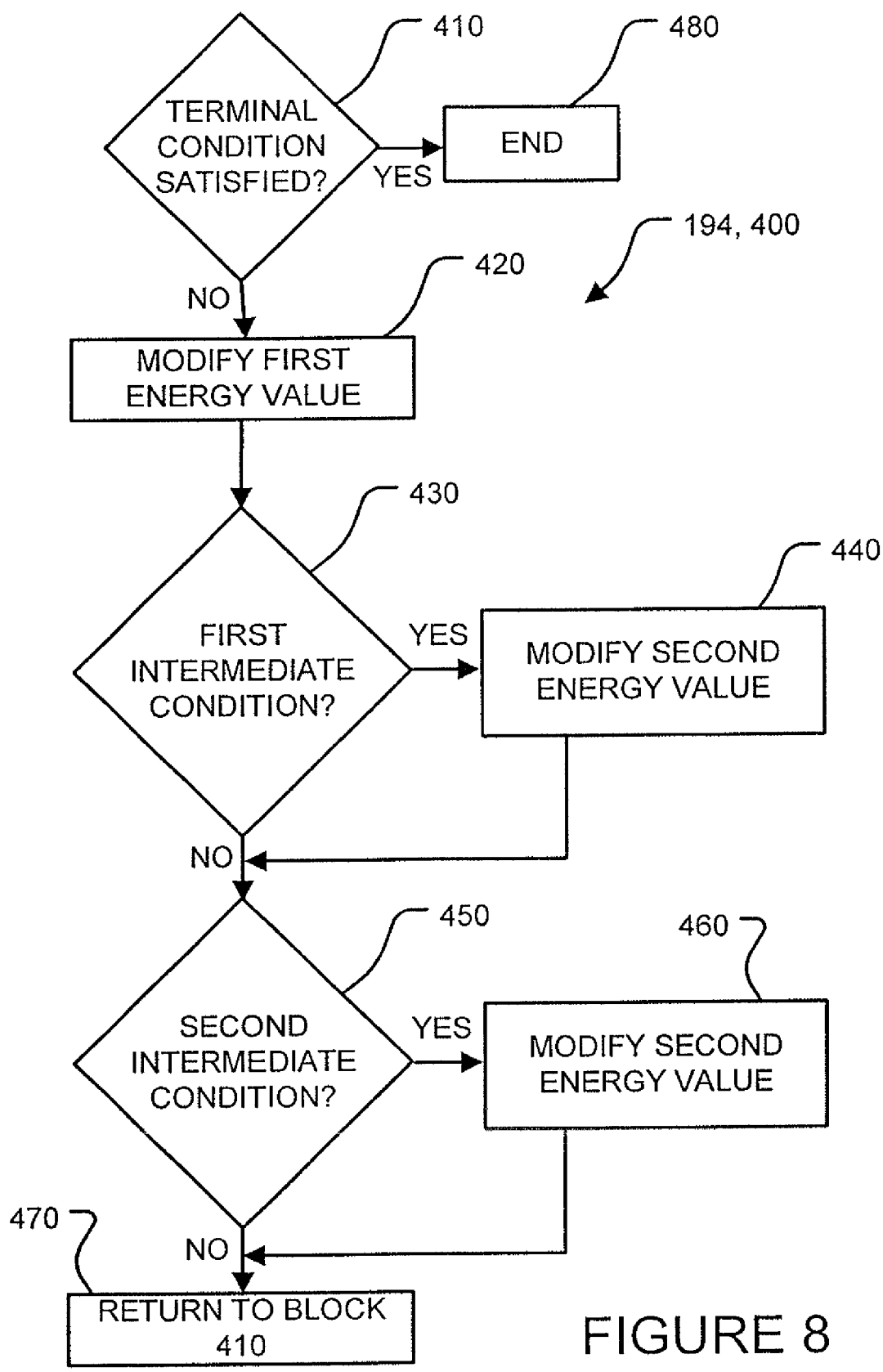
FIG. 8 shows a method for energy value modification used in embedding watermark data into a media file in accordance with a particular embodiment.

FIG. 8 schematically depicts a method 400 for the block 194 energy value modification according to a particular embodiment of the invention. Method 400 may involve modifying the energy values 152A, 152B, 152C associated with each of the time slices 142 in a group G. Method 400 is general to any of the block 170 (FIG. 4) shape categories and to the situation where it is desired to modify energy values 152 so as to encode a 1 bit or to modify energy values 152 so as to encode a 0 bit.

Method 400 is explained first for the circumstance where the block 170 shape category is shape 1, the block 180 nominal bit value 182 is a bit 0 and it is desired to encode a bit 1. Method 400 starts in block 410 which involves evaluation of a terminal condition. The block 410 terminal condition may be expressed in terms of an error margin δ. The error margin 67 may be a percentage x % of the sum of the energy values 152 of a group G—i.e. $\delta=x(e_0+e_1+e_2)/100$ where $e_0$ is the first energy value 152A, $e_1$ is the second energy value 152B and $e_2$ is the third energy value 152C. In some embodiments, the error margin $\delta$ may be on the order of 0.2%-10% of the sum of the energy values $e_0+e_1+e_2$, for example. The size of the error margin may reflect a tradeoff between the robustness of the watermark and degradation of audio quality.

The block 410 terminal condition may be similar to the block 170 shape categorization rules. In the particular case of shape category 1, where it is desired to modify a nominal bit value 182 of bit 0 to bit 1, the block 410 terminal condition may be: $(e_2+e_0)/2>=e_1+\delta$. Typically, if method 100 (FIG. 2) has arrived at block 194, then the block 410 terminal condition will not be satisfied on the first iteration of method 400. Consequently, method 400 will proceed to block 420 via the block 410 NO output.

In block 420 method 400 involves modifying a first energy value 152. In the particular case of shape category 1 where it is desired to modify a nominal bit value 182 of 0 to a bit value of 1, block 420 may involve increasing the third energy value 152C ($e_2$). Block 420 may involve modifying the corresponding energy value 152 by a percentage y % of its previous value. In some embodiments, y is less than 2%. In one particular embodiment, y is 1%.

Method 400 then proceeds to block 430 which involves evaluating a first intermediate condition. In the illustrated embodiment, the block 430 first intermediate condition comprises a condition that ensures that subsequent energy value modifications do not cause the block 170 shape category of the group G to change. In the particular case of shape category 1 where it is desired to modify a nominal bit value 182 of 0 to a bit value of 1, the block 430 first intermediate condition may be if $e_1>e_0$. If the block 430 first intermediate condition is positive, then method 400 proceeds to block 440 which involves modifying another energy value. In the particular case of shape category 1 where it is desired to modify a nominal bit value 182 of 0 to a bit value of 1, block 440 may involve decreasing the second energy value 152B ($e_1$). Block 440 may involve modifying an energy value 152 by a percentage k % of its previous value. In some embodiments, k is less than 2%. In one particular embodiment, k is 1%.

After block 440 (or in the case where the block 430 inquiry is negative), method 400 proceeds to a second intermediate inquiry in block 450. In the illustrated embodiment, the block 450 second intermediate condition comprises a condition that ensures that subsequent energy value modifications do not cause the block 170 shape category of the group G to change. In the particular case of shape category 1 where it is desired to modify a nominal bit value 182 of 0 to a bit value of 1, the block 450 second intermediate condition may be if $e_0<e_1$. If the block 450 second intermediate condition is positive, then method 400 proceeds to block 460 which involves modifying another energy value. In the particular case of shape category 1 where it is desired to modify a nominal bit value 182 of 0 to a bit value of 1, block 460 may involve increasing the first energy value 152A ($e_2$). Block 460 may involve modifying an energy value 152 by a percentage l % of its previous value. In some embodiments, l is less than 2%. In one particular embodiment, l is 1%.

After block 460 (or in the case where the block 450 inquiry is negative), method 400 proceeds to block 470 where method 400 returns to block 410 to re-evaluate the terminal condition. Method 400 continue to loop in this manner until the block 410 terminal condition is satisfied, in which case method 400 proceeds to block 480 and ends. By potentially modifying all three energy values 152 in a group G, method 400 may achieve the desired change in bit value relatively quickly (i.e. with fewer iterations) and may therefore consume a relatively low amount of processing resources.

Method 400 may also be used for other block 170 shape categories and bit value changes. The various blocks in a particular embodiment of method 400 are shown below for each of the other block 170 shape category changes and each of the other bit value changes.

Shape category 1, changing a nominal bit value of 1 to a bit value of 0
Block 410 terminal condition: $(e_2+e_0)/2<=e_1-\delta$
Block 420: decrease $e_0$ by y %
Block 430 first intermediate condition: $e_1<e_2$
Block 440: increase $e_1$ by k %
Block 450 second intermediate condition: $e_2>e_1$
Block 460: decrease $e_2$ by l %

Shape category 2, changing a nominal bit value of 0 to a bit value of 1
Block 410 terminal condition: $(e_2+e_0)/2>=e_1+\delta$
Block 420: increase $e_0$ by y %
Block 430 first intermediate condition: $e_1>e_2$
Block 440: decrease $e_1$ by k %
Block 450 second intermediate condition: $e_2<e_1$
Block 460: increase $e_2$ by l %

Shape category 2, changing a nominal bit value of 1 to a bit value of 0
Block 410 terminal condition: $(e_2+e_0)/2<=e_1-\delta$
Block 420: decrease $e_2$ by y %
Block 430 first intermediate condition: $e_1>e_0$
Block 440: increase $e_1$ by k %
Block 450 second intermediate condition: $e_0>e_1$
Block 460: decrease $e_0$ by l %

Shape category 3, changing a nominal bit value of 0 to a bit value of 1
Block 410 terminal condition: $(e_1+e_0)/2>=e_2+\delta$
Block 420: increase $e_1$ by y %
Block 430 first intermediate condition: $e_2>e_0$
Block 440: decrease $e_2$ by k %
Block 450 second intermediate condition: $e_0<e_2$
Block 460: increase $e_0$ by l %

Shape category 3, changing a nominal bit value of 1 to a bit value of 0
Block 410 terminal condition: $(e_1+e_0)/2<=e_2-\delta$
Block 420: decrease $e_0$ by y %
Block 430 first intermediate condition: $e_2<e_1$
Block 440: increase $e_2$ by k %
Block 450 second intermediate condition: $e_1>e_2$
Block 460: decrease $e_1$ by l %

Shape category 4, changing a nominal bit value of 0 to a bit value of 1
Block 410 terminal condition: $(e_2+e_1)/2<=e_0-\delta$
Block 420: decrease $e_2$ by y %
Block 430 first intermediate condition: $e_0<e_1$
Block 440: increase $e_0$ by k %
Block 450 second intermediate condition: $e_1>e_0$
Block 460: decrease $e_1$ by l %

Shape category 4, changing a nominal bit value of 1 to a bit value of 0
Block 410 terminal condition: $(e_2+e_1)/2>=e_0+\delta$
Block 420: increase $e_1$ by y %
Block 430 first intermediate condition: $e_0>e_2$
Block 440: decrease $e_0$ by k %
Block 450 second intermediate condition: $e_2<e_0$
Block 460: increase $e_2$ by l %

Shape category 5, changing a nominal bit value of 0 to a bit value of 1
Block 410 terminal condition: $(e_1+e_0)/2>=e_2+\delta$
Block 420: increase $e_0$ by y %

Block 430 first intermediate condition: $e_2 > e_1$
Block 440: decrease $e_2$ by k %
Block 450 second intermediate condition: $e_1 < e_2$
Block 460: increase $e_1$ by l %
Shape category 5, changing a nominal bit value of 1 to a bit value of 0
Block 410 terminal condition: $(e_1+e_0)/2 <= e_2 - \delta$
Block 420: decrease $e_1$ by y %
Block 430 first intermediate condition: $e_2 < e_0$
Block 440: increase $e_2$ by k %
Block 450 second intermediate condition: $e_0 > e_2$
Block 460: decrease $e_0$ by l %
Shape category 6, changing a nominal bit value of 0 to a bit value of 1
Block 410 terminal condition: $(e_2+e_1)/2 <= e_0 - \delta$
Block 420: decrease $e_1$ by y %
Block 430 first intermediate condition: $e_0 < e_2$
Block 440: increase $e_0$ by k %
Block 450 second intermediate condition: $e_2 > e_0$
Block 460: decrease $e_2$ by l %
Shape category 6, changing a nominal bit value of 1 to a bit value of 0
Block 410 terminal condition: $(e_2+e_1)/2 >= e_0 + \delta$
Block 420: increase $e_2$ by y %
Block 430 first intermediate condition: $e_0 > e_1$
Block 440: decrease $e_0$ by k %
Block 450 second intermediate condition: $e_1 < e_0$
Block 460: increase $e_1$ by l %
Those skilled in the art will appreciate that the technique described above represents a particular embodiment of the invention and that other techniques for implementing the block 194 energy value modification are possible.

Block 194 may involve a wide variety of modifications to energy value(s) 152 to modify a particular group G's nominal bit value 182 of 0 to a new bit value 195 of 1 or from a particular group G's nominal bit value 182 of 1 to a new bit value 195 of 0 in order to encode a desired bit of FEC watermark data 108'. However, it will be appreciated that the block 194 modification of energy value(s) 152 necessitates corresponding changes in audio data 104. That is, modification of energy value(s) 152 in block 194 comprises corresponding adjustment to the values on individual samples in audio data 104 such that re-application of the block 250 integration process would yield the modified energy value(s) 152. For example, an increase in an energy value 152 of a particular time slice 142 may involve increasing the values of individual samples within the corresponding time slice 142 and a decrease in an energy value 152 of a particular time slice 142 may involve decreasing the values of individual samples within the corresponding time slice 142.

The adjustment of the individual samples in audio data 104 may be made by adding/subtracting corresponding offsets to the original sample values of audio data 104 or by multiplying the original samples of audio data 104 by suitable scaling factors, for example. The block 194 modifications may be constrained by their effect on playback of the audio content represented by audio data 104. If the block 194 modification(s) to energy value(s) 152 are too significant, then the embedded FEC watermark data 180' will impact playback of the audio content represented by audio data 104 in a manner that is detectable to the human ear.

As discussed above and shown in the illustrated examples of FIGS. 5A-5C and FIG. 8, there are a variety of block 194 modifications to energy value(s) 152 that would have the effect of changing a nominal bit value 182 of 1 to a new bit value 195 of 0 or of changing a nominal bit value 182 of 0 to a new bit value 195 of 1. In some embodiments, the block 194 modification process comprises techniques for selecting between a variety of suitable adjustments to energy value(s) 152, so as to modify a nominal bit value 182 of 0 to a new bit value 195 of 1 or a nominal bit value 182 of 1 to a new bit value 195 of 0 using minimum changes to energy value(s) 152, so as to minimize the impact on playback of the audio content represented by audio data 104. Where the number of time slices 142 in a group G is three (as is the case in the illustrated embodiment), such techniques for minimizing changes to energy value(s) 152 may involve minimizing the function $f = \Delta E_1 + \Delta E_2 + \Delta E_3$, where $\Delta E_i$ represents the change in the $i^{th}$ energy value 152, subject to the constraint that the nominal bit value 182 must change to a new bit value 195, either by changing the nominal bit value 182 within a block 170 shape category or by changing to a new block 170 shape category.

Block 194 may comprise a thresholding process. That is, block 194 may have a limit to the amount of modification of any individual energy value 152 and/or to the aggregate modification of the energy values 152 within a particular group G. This thresholding process may be related to a percentage change in the energy value(s) 152, for example. In one particular example, a maximum change to any one particular energy value 152 within a group G is 10% and the maximum aggregate change (i.e. to the sum of energy values 152 within a group G) is 25%. In a small number of cases, it may not be possible to modify the nominal bit value 182 of a group G while complying with the block 194 thresholding process. In such cases, the energy values 152 of the group G need not be adjusted and the resultant corrupted bit of the group G can be reliably accommodated using forward error correction decoding as discussed in more detail below.

As discussed above, modification of an energy value 152 corresponding to a particular time slice 142 in block 194 also involves corresponding adjustment of the amplitudes of individual samples (see samples 14 in FIG. 1) of audio data 104 within the corresponding time slice 142—i.e. such that re-application of the block 150 integration to the time slice 142 would result in the modified energy value 152. The amount by which each sample in a particular time slice 142 is varied may represent a fraction of the amount by which the energy value 152 of the time slice 142 is modified. The change in the energy value 152 may be divided equally between the samples in the time slice 142.

In some embodiments, the adjustment of the individual samples may be performed such that there is no change (or minimal change) to the samples at (or near) the beginning and end of time slice 142. This can help to avoid a clipping effect at the boundaries of adjacent time slices 142. In some embodiments, the adjustment of the energy value 152 of a particular time slice 142 may be performed in such a manner that the aggregate change in the energy value 152 is provided, but that the modifications to the individual samples in time slice 142 are performed (e.g. weighted) in accordance with a function that is relatively large for samples near the middle of time slice 142 and relatively small for samples at the edges of time slice 142. By way of non-limiting example, the adjustment of the individual samples may be performed in accordance with a parabolic function having a vertex at or near the middle sample to the time slice 142. The function used to perform the adjustment of the individual samples of the time slice 142 may have zeroes at the samples corresponding to the edges of the time slice 142 (in the case where the block 194 modification is applied via an additive offset) or may have unity values at the samples corresponding to the edges of the time slice 142 (in the case where the block 194 modification is applied via a multiplicative scaling factor). Again, such functions can help to avoid clipping effects at the boundaries of the time slice 142 that may be audible to a listener.

In addition to or in the alternative to thresholding processes or uneven distributions of adjustments to the individual samples, block 194 may involve other rules and or processes intended to limit the impact of the block 194 watermarking modifications on the quality of the playback of the audio content corresponding to audio data 104.

After block 194, method 100 proceeds to block 196 which involves repeating the procedures of blocks 170, 180, 190 and, if necessary, block 194 for each group G of time slices 142 until the desired FEC watermark 108' is embedded into audio data 104. Method 100 may terminate when FEC watermark 108' is fully embedded in audio data 104. In some embodiments, block 196 involves repeating blocks 170-194 until the end of the available audio data 104 by looping back to the beginning of FEC watermark 108' each time that FEC watermark 108' has been completely embedded. Embedding multiple successive FEC watermarks 108' may permit even more significant compression and/or manipulation of the watermarked media data while permitting the watermark to be successfully extracted when desired.

Extracting the Watermark

Figure 6:
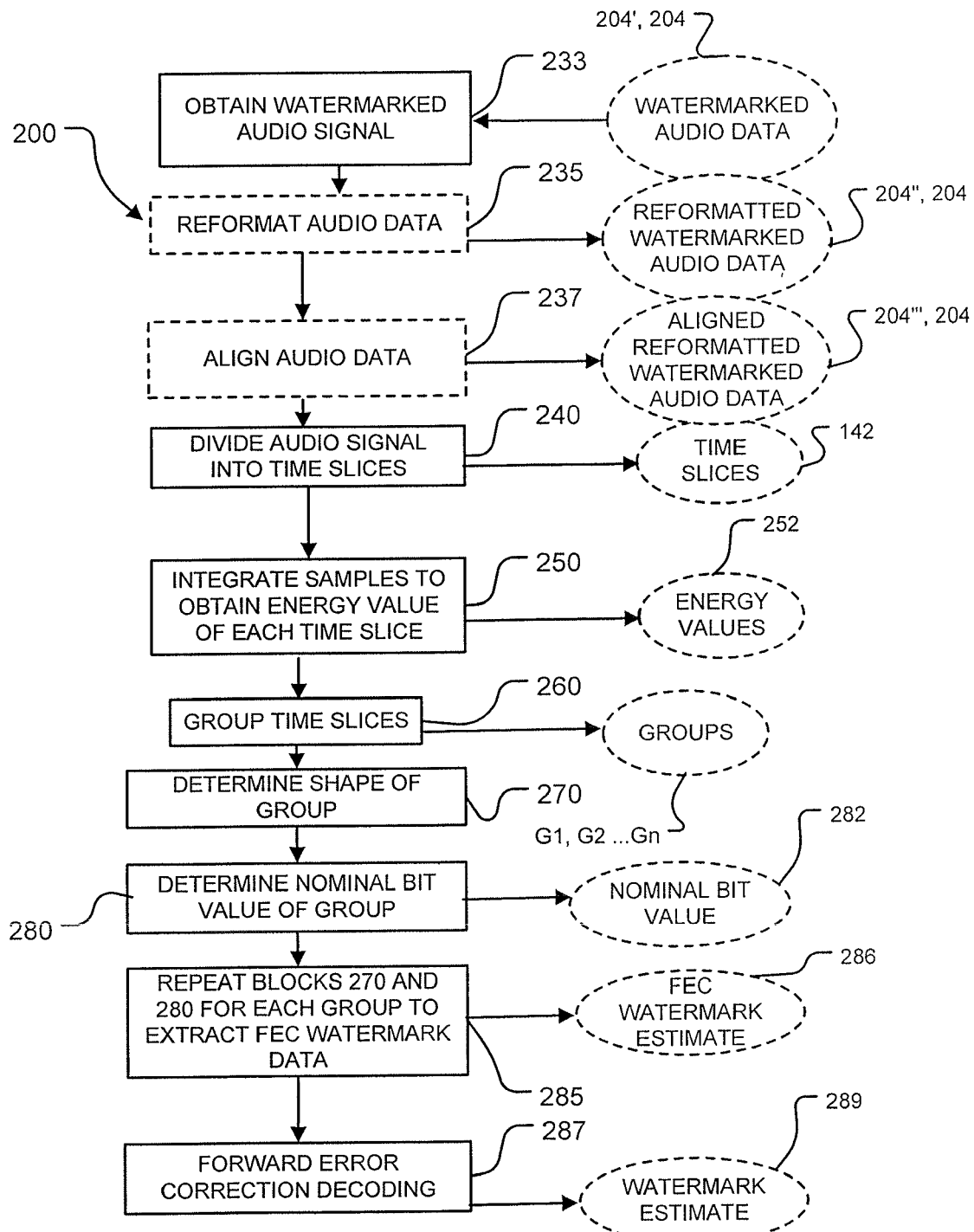
FIG. 6 shows a method for extracting a watermark from watermarked media data according to a particular embodiment of the invention.

FIG. 6 schematically depicts a method 200 for extracting a watermark from watermarked media data 204' in accordance with a particular embodiment of the invention. Method 200 starts in block 233 by obtaining watermarked audio data 204'. Watermarked audio data 204' obtained in block 233 may be identical to watermarked audio data 204 generated by method 100. This is not necessary, however, as watermarked audio data 204' may have been modified after the application of method 100 but prior to being received in block 233. By way of non-limiting example, audio data 204' may have: been compressed (e.g. converted to MP3 format), been amplified (e.g. increasing or decreasing the magnitudes of individual samples), been re-sampled, converted to analog format, been manipulated in the frequency domain (e.g. non-uniform amplification of certain frequency components), undergone channel mixing, undergone channel reduction, had noise added to it or the like.

Method 200 then proceeds to optional block 235 where the watermarked audio data 204' s reformatted into reformatted audio data 204" which is in a suitable format for extracting the watermark. The block 235 reformatting may not be required in the case where watermarked audio data 204' is already in a format suitable for extracting the watermark. In the illustrated embodiment of method 200, audio data 204' (or reformatted audio data 204") will be in a format suitable for extracting the watermark if it is digitally sampled at the same rate as the audio data 104 into which the watermark was inserted by method 100. Accordingly, the block 235 reformatting may comprise, by way of non-limiting example: sampling audio data 204' (e.g. in the case where audio data 204' is in analog format), resampling audio data 204' (e.g. in the case where audio data 204' is has been down-sampled), decompression (e.g. in the case where audio data 204' has been compressed), or the like. Watermark extraction method 200 is robust to amplification, frequency domain manipulation and channel mixing/reduction. Accordingly, the block 235 reformatting does not generally require reformatting to address these types of manipulations.

Method 200 then proceeds to block 237 which involves optionally aligning the watermarked audio data 204' (or the reformatted watermarked audio data 204") to generate aligned reformatter watermarked audio data 204'. In cases where method 200 has access to the original audio data 104 or to the original watermarked audio data 204, then block 237 may comprise aligning watermarked audio data 204' (or reformatted watermarked audio data 204") to the original audio data 104 or to the original watermarked audio data 204. The block 237 alignment between watermarked audio data 204' (or reformatted watermarked audio data 204") and the original audio data 104 (or the original watermarked audio data 204) may be done by visually comparing the waveform (e.g. by a human user). Additionally or alternatively, the block 237 alignment may comprise comparing the two data sets using a suitable metric between individual samples (e.g. by a least squares comparison or some other suitable metric). The watermarked audio data 204' (or reformatted watermarked audio data 204") may be translated in the time domain by adding zeroes or by removing samples at the beginning or the end of the data stream, so as to align watermarked audio data 204' (or reformatted watermarked audio data 204") more closely to the original audio data 104 (or the original watermarked audio data 204). Adding zeros and/or removing data may be repeated until the least squares comparison (or other suitable metric) is minimized or until the visual waveform comparison indicates that waveforms are aligned. The result of the block 237 alignment process is aligned reformatted watermarked audio data 204'. There may be other suitable techniques for aligning watermarked audio data 204' (or reformatted watermarked audio data 204") to the original audio data 104 (or the original watermarked audio data 204).

In some cases, watermarked audio data 204' (or reformatted audio data 204") may already be aligned with the original audio data 104 of the original watermarked audio data 204. In this circumstance, the block 237 alignment procedure may not be required. In some cases, neither the original audio data 104 nor the original watermarked audio data 204 are available. In this circumstance, method 200 may bypass the block 237 alignment procedure. The situation where neither the original audio data 104 nor the original watermarked audio data 204 is available is discussed in more detail below.

For simplicity, watermarked audio data 204', reformatted watermarked audio data 204" and aligned reformatted audio data 204''' are referred to in the remainder of this description as watermarked audio data 204, it being understood that watermarked audio data 204 may comprise any of watermarked audio data 204', reformatted watermarked audio data 204" and aligned reformatted audio data 204'''.

Method 200 processes watermarked audio data 204 in blocks 240, 250, 260, 270 and 280. Blocks 240, 250, 260, 270 and 280 may respectively be substantially similar to blocks 140, 150, 160, 170 and 180 of method 100. Blocks 240, 250, 260, 270 and 280 involve dividing watermarked audio data 204 into sections/time slices 242, integrating the samples in each time slice 242 to obtain an energy value 252 for each time slice 242, grouping the time slices 242 into groups G, categorizing each time slice 242 into a shape category and applying a bit assignment rule to each group G to determine a nominal bit value 282 for each group G. Because of the embedded watermark (i.e. because of the block 194 modification of energy values 152), the energy values 252 assigned to each group G in block 250 may be different than the energy values 152 assigned to each group G in block 150. Similarly, the block 280 application of the bit assignment rule will typically result in different nominal bit values 282 than the nominal bit values 182 obtained when the bit assignment rule is applied in block 180.

The nominal bit values 282 extracted in the block 280 application of the bit assignment rule represent the method 200 estimate of the FEC watermark bit corresponding to a particular group G. The estimated FEC watermark estimate is referred to in FIG. 6 as FEC watermark estimate 286. Block 285 involves repeating the processes of blocks 270 and 280 for each group G of time slices 242 to obtain an FEC watermark estimate 286 for each group G. In some embodiments, block 285 may involve repeating blocks 270 and 280 until a single FEC watermark estimate 286 is extracted. In other embodiments, where multiple successive watermarks are encoded into watermarked media data 204', block 285 may comprise repeating blocks 270 and 280 until the end of watermarked media data 204'. In such cases, FEC watermark estimate 286 may comprise more than one single estimate of FEC watermark 108' and method 200 may comprise subsequently processing the multiple FEC watermark estimates in FEC watermark estimate 286 to obtain bit values for a single FEC watermark estimate. By way of non-limiting example, such subsequent processing may comprise averaging and/or filtering the data from the multiple FEC watermark estimates to obtain bit values for a single FEC watermark estimate. Encoding and extracting multiple successive repetitions of FEC watermark 108' into audio data 104 may permit even more significant compression and/or manipulation of watermarked media data 204 while permitting watermark 108 to be successfully extracted from watermarked media data 204' when desired.

Block 287 involves applying a forward error correction decoding scheme to FEC watermark estimate 286. The forward error correction decoding in block 287 is complementary to the forward correction encoding in block 120 of method 100. As discussed above, in one particular embodiment, blocks 120 and 287 make use of LDPC forward error correction techniques. The output of block 287 is watermark estimate 289 which represents the method 200 estimate of watermark data 108. Preferably, watermark estimate 289 is identical to watermark data 108. Advantageously, the forward error correction of blocks 120 and 287 allows the nominal bit values determined in blocks 270 and 280 to have a relatively large number of errors while still ensuring that watermark estimate 289 is identical to watermark 108. That is, the FEC watermark estimate 286 obtained in block 285 need not be identical to FEC watermark 108'. In preferred embodiments, as many as ⅓ or more of the data bits of watermark estimate 286 may contain errors and may still yield a watermark estimate 289 that is identical to watermark data 108.

Once watermark estimate 289 is obtained, it may be used for a wide variety of purposes including, without limitation, looking up additional data in a suitable database which may be indexed by watermark data 108.

As mentioned briefly above, in some cases, neither the original audio data 104 nor the original watermarked audio data 204 are available. In such circumstances, it is still possible to use a method similar to method 200 to extract a watermark estimate 289. Watermark estimate 289 can then be compared to watermark data 108, for example. If neither the original audio data 104 nor the original watermarked audio data 204 are available, then it is not possible to implement the block 237 alignment procedures discussed above. Instead, the relevant parts of method 200 may be implemented several times with different time domain translations of the watermarked audio data 204 and the resulting watermark estimates 289 from each iteration may be compared to watermark data 108.

In one embodiment where neither the original audio data 104 nor the original watermarked audio data 204 are available, method 200 (without block 237) may be implemented a first time and the resulting watermark estimate 289 may be compared to watermark data 108. If the watermark estimate 289 matches (or is sufficiently close to matching) watermark data 108, then it is concluded that watermarked audio data 204 was indeed watermarked with watermark data 108. If the watermark estimate 289 does not match watermark data 108, then the watermarked audio data 204 may be shifted by n samples in the time domain (e.g. by adding n samples at the beginning or end of watermarked audio data 204 or by removing n samples from the beginning or end of watermarked audio data 204). In some embodiments, n may be greater than 100,000 samples, for example, which corresponds to a time shift of ~2.5 seconds for 44.1 kHz audio sampling rate. In one particular embodiment, n is 3,000 samples.

After watermarked audio data 204 is shifted, blocks 240 through 287 of method 200 are repeated to obtain a second watermark estimate 289. This second watermark estimate 289 is again compared to watermark data 108 to ascertain whether there is a match. If there is no match, then watermarked audio data 204 may be shifted by a suitable fraction of n samples in the time domain. For example, watermarked audio data 204 may be shifted by n/2 samples. Again, blocks 240 through 287 of method 200 are repeated to obtain a third watermark estimate 289, which is compared to watermark data 108. If there is no match, then watermarked audio data 204 may be shifted by a smaller fraction of n samples in the time domain. For example, watermarked audio data 204 may be shifted by n/4 samples. Again, blocks 240 through 287 of method 200 are repeated to obtain a fourth watermark estimate 289, which is compared to watermark data 108. If there is no match, then watermark audio data 204 may be shifted by a multiple of the smaller fraction, if this shift has not yet been evaluated. For example, watermarked audio data 204 may be shifted by 3n/4 samples. Similarly, for a fraction n/8, watermarked audio data 204 may be shifted by 3n/8, 5n/8 and 7n/8.

This process may be repeated until either it is concluded that watermark data 108 is embedded in watermarked audio data 204 or until the shift of watermarked audio data 204 approaches a sufficiently small number that it may be concluded that audio data 204 is, in fact, not watermarked. In some embodiments, this condition for discontinuing the watermark retrieval process is a shift of less than 200 samples.

Figure 7:
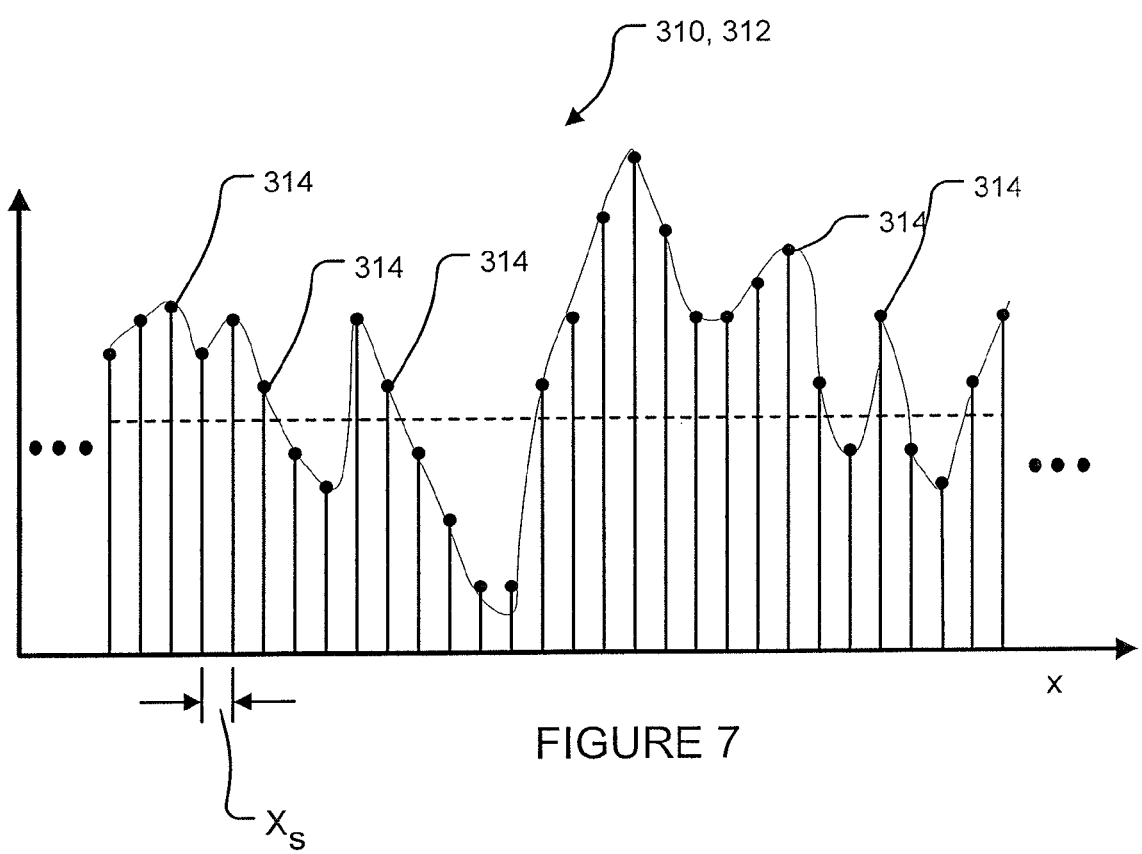
FIG. 7 is a schematic depiction of digital image data which may be watermarked in accordance with the invention.

The watermarking process of method 100 and/or the watermark extraction process of method 200 may easily be modified for application to other forms of digital media. For example, FIG. 7 schematically depicts monochromatic (or grayscale) digital image data 310 which may be represented as a series 312 of samples 314 in a spatial domain (referred to as x in the schematic illustration of FIG. 7). Each of samples 314 may be referred to as a pixel 314 of image data 310. Typically image data 310 is two dimensional. Image data 310 may comprise pixels 314 corresponding to a portion of a two dimensional image. By way of non-limiting example, image data 310 may comprise pixels from one row of the image, one column of the image or one rectangular section of the image, for example. Image data 310 may comprise a concatenation of the pixels corresponding to the two dimensional image into a single array. By way of non-limiting example, image data 310 may comprise a concatenation of the pixels corresponding to two or more rows of the two dimensional image. In the illustrated example of FIG. 7, the sampling period of image data 310 is $X_s$ in the spatial domain x.

When applying methods 100 and 200 to digital image data 310, the block 140 and 240 time slices 142, 242 may actually represent spatial slices (in the spatial dimension x of the FIG. 7 schematic illustration). Accordingly, references to "time slices" in the description above should be understood to include or otherwise refer to "sections" which may be in any suitable sampling domain. Each section comprises a plurality of samples which are adjacent to one another in the sampling domain.

Color image data may comprise a plurality of sample values for each pixel. For example, in the case of RGB representation, each pixel may comprise a red sample value and green sample value and a blue sample value. In such cases, watermark data may be encoded into one set of sample values (e.g. the green sample values) or into each set of sample values or into some pattern of alternating between the sets of sample values.

In other respects, the application of methods 100 and/or 200 to image data 310 may be similar to that described above for audio data.

The watermarking process of method 100 and/or the watermark extraction process of method 200 may also easily be modified for application to video media data. When applying methods 100, 200 to video media data, each frame (or particular portions of each frame) of the video media data may be treated as two dimensional images of the type described above and then the video data may be processed in the manner described above for still images. Additionally or alternatively, when applying methods 100, 200 to video media data, each frame (or particular portions of each frame) may be treated as a time slice/section.

Certain implementations of the invention comprise computer processors which execute software instructions which cause the processors to perform one or more methods of the invention. For example, methods 100 and/or 200 may be implemented by one or more processors which execute software instructions which cause the processor to perform these methods. Such software instructions may be retrieved from a program memory accessible to the processors. The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

when grouping time slices 142 into groups G (blocks 160, 260), groups G may be selected such that one or more time slices/sections 142 on the edge(s) of group G overlap with an adjacent group G. For example, the last time slice/section 142 of the first group $G_1$ may also be the first time slice/section 142 of the second group $G_2$. This type of overlapping is permissible, provided that the energy value(s) 152 of the overlapped time slice(s)/section(s) 142 is not varied in block 194. Accordingly, block 194 may comprise a process for preventing the energy value(s) 152 corresponding to the overlapped time slice(s)/section(s) 142 from being selected for modification. Alternatively, it may be possible to allow the energy value(s) 152 of the overlapped time slice(s)/section(s) 152 to be varied in block 194, but to impose limits on the variation of the energy value(s) 152 of overlapped time slice(s) 152 based on the effect of such energy value variation on the shape category and/or nominal bit value 182 of the adjacent group G. For example, it may be possible to allow the energy value 152 of an overlapped time slice/section 142 to be varied in block 194, but to impose limits on the variation of the energy value 152 of the overlapped time slice/section 142 based on a desire not to change the shape category of the adjacent group G. The overlapping of time slices 142 from adjacent groups G provides a larger number of groups G within a given set of media data and therefore allows a correspondingly greater number of watermarking bits to be encoded into the media data.

The methods described above need not be implemented in the specific order illustrated in the schematic drawings and that the order of the operations described in the schematic block diagrams may vary while achieving the same effect. For example, those skilled in the art can envisage other looping structures, where a blocks 140, 150, 160, 170, 180, 190 and if necessary block 194 are performed for a single group G of time slices/sections 142 and then the process loops back to block 140 for the next time slice/section 142.

The shapes described above and shown in FIG. 4 represent one possible categorization of shapes when each group G includes three time slices/sections 142. Groups G may be defined to have a different number of time slices/section 142, in which case the available shape categories may differ. For example, if groups G are defined to comprise four time slices/sections 142, then there could be a large number of shape categories.

Method 400 described above, comprises repetitively incrementally modifying energy values by a percentage of their previous value. In this manner, sections having larger energy values are modified relatively more than sections having smaller energy values. This is not necessary. In some embodiments, method 400 could be implemented by repetitively incrementally modifying energy values by absolute amounts.

What is claimed is:

1. A method for encoding watermark information into media data containing a series of digital samples in a sample domain, the method comprising:

dividing the series of digital samples into a plurality of sections in the sample domain, each section comprising a corresponding plurality of samples;

processing the corresponding plurality of samples in each section to obtain a single energy value associated with each section;

grouping the sections into groups, each group containing three or more sections;

assigning a nominal bit value to each group according to a bit assignment rule, the bit assignment rule based on the energy values of the sections in the group;

assigning a watermark bit value to each group;

for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;

wherein assigning the nominal bit value to each group according to the bit assignment rule comprises:

categorizing each group into one of a plurality of categories according to a categorization rule; and for each category, assigning a nominal zero bit value or a nominal one bit value to each group according to a unique category bit assignment rule associated with the category; and wherein, for each category, the corresponding category bit assignment rule is based on relative differences between the energy values of sections that are adjacent to one another in the sample domain.

2. A method for encoding watermark information into media data containing a series of digital samples in a sample domain, the method comprising:

dividing the series of digital samples into a plurality of sections in the sample domain, each section comprising a corresponding plurality of samples;

processing the corresponding plurality of samples in each section to obtain a single energy value associated with each section;

grouping the sections into groups, each group containing three or more sections;

assigning a nominal bit value to each group according to a bit assignment rule, the bit assignment rule based on the energy values of the sections in the group;

assigning a watermark bit value to each group;

for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;

wherein assigning the nominal bit value to each group according to the bit assignment rule comprises:

categorizing each group into one of a plurality of categories according to a categorization rule; and for each category, assigning a nominal zero bit value or a nominal one bit value to each group according to a unique category bit assignment rule associated with the category;

wherein each group comprises an ordered plurality of three or more sections, wherein first and second sections are adjacent to one another in the sample domain and a third section is adjacent to the second section in the sample domain, but spaced apart from the first section in the sample domain; and wherein, for each category, the corresponding category bit assignment rule is based on a difference between the energy values of the first and second sections relative to a difference between the energy values of the second and third sections.

3. A method for encoding watermark information into media data containing a series of digital samples in a sample domain, the method comprising:

dividing the series of digital samples into a plurality of sections in the sample domain, each section comprising a corresponding plurality of samples;

processing the corresponding plurality of samples in each section to obtain a single energy value associated with each section;

grouping the sections into groups, each group containing three or more sections;

assigning a nominal bit value to each group according to a bit assignment rule, the bit assignment rule based on the energy values of the sections in the group;

assigning a watermark bit value to each group;

for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;

wherein assigning the nominal bit value to each group according to the bit assignment rule comprises:

categorizing each group into one of a plurality of categories according to a categorization rule; and for each category, assigning a nominal zero bit value or a nominal one bit value to each group according to a unique category bit assignment rule associated with the category;

wherein each group comprises an ordered plurality of three or more sections, wherein first and second sections are adjacent to one another in the sample domain and a third section is adjacent to the second section in the sample domain, but spaced apart from the first section in the sample domain; and wherein, for each category, the category bit assignment rule is based on a slope between the energy values of the first and second sections relative to a slope between the energy values of the second and third sections.

4. A method according to claim 1 wherein modifying one or more energy values of one or more corresponding sections in the group comprises modifying a single energy value corresponding to a single section in the group.

5. A method according to claim 1 wherein modifying one or more energy values of one or more corresponding sections in the group comprises modifying the one or more energy values in the group in such a manner that re-application of the categorization rule to the group would categorize the group into a different category.

6. A method according to claim 1 wherein modifying one or more energy values of one or more corresponding sections in the group comprises modifying the one or more energy values in the group in such a manner that re-application of the category bit assignment rule to the group would assign a different bit value to the group but that re-application of the categorization rule to the group would categorize the group into the same category.

7. A method according to claim 1 wherein modifying one or more energy values of one or more corresponding sections in the group comprises modifying three or more energy values corresponding to three or more sections in the group.

8. A method according to claim 7 wherein modifying the three or more energy values corresponding to three or more sections in the group comprises repetitively incrementally modifying at least one of the three or more energy values until satisfying a termination condition, the termination condition based on the three or more energy values.

9. A method for encoding watermark information into media data containing a series of digital samples in a sample domain, the method comprising:

dividing the series of digital samples into a plurality of sections in the sample domain, each section comprising a corresponding plurality of samples;

processing the corresponding plurality of samples in each section to obtain a single energy value associated with each section;

grouping the sections into groups, each group containing three or more sections;
assigning a nominal bit value to each group according to a bit assignment rule, the bit assignment rule based on the energy values of the sections in the group;
assigning a watermark bit value to each group;
for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;
wherein assigning the nominal bit value to each group according to the bit assignment rule comprises:
categorizing each group into one of a plurality of categories according to a categorization rule; and
for each category, assigning a nominal zero bit value or a nominal one bit value to each group according to a unique category bit assignment rule associated with the category; and
wherein modifying one or more energy values of one or more corresponding sections in the group comprises incrementally modifying at least one of the one or more energy values until satisfying a termination condition, the termination condition based on the one or more energy values of the one or more corresponding sections in the group.

10. A method according to claim 9 wherein the termination condition comprises a condition where re-application of the bit assignment rule would assign the watermark bit value to the group modified by an error margin δ.

11. A method according to claim 10 wherein modifying one or more energy values of one or more corresponding sections in the group comprises minimizing a sum of the changes to the one or more energy values while satisfying the termination condition.

12. A method according to claim 1 wherein grouping the sections into groups comprises defining the groups to overlap one another such that the adjacent groups in the sampling domain include one or more sections in common.

13. A method for encoding watermark information into media data containing a series of digital samples in a sample domain, the method comprising:
dividing the series of digital samples into a plurality of sections in the sample domain, each section comprising a corresponding plurality of samples;
processing the corresponding plurality of samples in each section to obtain a single energy value associated with each section;
grouping the sections into groups, each group containing three or more sections;
assigning a nominal bit value to each group according to a bit assignment rule, the bit assignment rule based on the energy values of the sections in the group;
assigning a watermark bit value to each group;
for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;
wherein grouping the sections into groups comprises defining the groups to overlap one another such that the adjacent groups in the sampling domain include one or more sections in common; and
wherein modifying one or more energy values of one or more corresponding sections in the group comprises avoiding modifying energy values of sections that are common to more than one group.

14. A method according to claim 1 wherein the corresponding plurality of samples in each section is equal and wherein processing the corresponding plurality of samples in each section includes, for each section, integrating values of the corresponding plurality of samples in the section to obtain the energy value without performing a division operation.

15. A method for encoding watermark information into media data containing a series of digital samples in a sample domain, the method comprising:
dividing the series of digital samples into a plurality of sections in the sample domain, each section comprising a corresponding plurality of samples;
processing the corresponding plurality of samples in each section to obtain a single energy value associated with each section;
grouping the sections into groups, each group containing three or more sections;
assigning a nominal bit value to each group according to a bit assignment rule, the bit assignment rule based on the energy values of the sections in the group;
assigning a watermark bit value to each group;
for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;
wherein the watermark information comprises an index to a database record, the database record comprising additional information relating to the media data.

16. A method for encoding watermark information into media data containing a series of digital samples in a sample domain, the method comprising:
dividing the series of digital samples into a plurality of sections in the sample domain, each section comprising a corresponding plurality of samples;
processing the corresponding plurality of samples in each section to obtain a single energy value associated with each section;
grouping the sections into groups, each group containing three or more sections;
assigning a nominal bit value to each group according to a bit assignment rule, the bit assignment rule based on the energy values of the sections in the group;
assigning a watermark bit value to each group;
for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;
wherein modifying one or more energy values of one or more corresponding sections in the group comprises, for each section having a modified energy value, adjusting values of one or more of the corresponding plurality of samples.

17. A method according to claim 16 wherein for each section having a modified energy value, adjusting values of one or more of the corresponding plurality of samples comprises adjusting all of the corresponding plurality of samples by generally equal amounts.

18. A method according to claim 16 wherein for each section having a modified energy value, adjusting values of one or more of the corresponding plurality of samples comprises adjusting the values of at least some samples nearer to a center of the section in the sample domain by an amount greater than the values of at least some of samples nearer to an edge of the section in the sample domain.

19. A method according to claim 18 wherein for each section having a modified energy value, adjusting values of one or more of the corresponding plurality of samples comprises making no adjustment to the values of the at least some of the samples nearer to an edge of the section in the sample domain.

20. A method for encoding watermark information into media data containing a series of digital samples in a sample domain, the method comprising:
dividing the series of digital samples into a plurality of sections in the sample domain, each section comprising a corresponding plurality of samples;
processing the corresponding plurality of samples in each section to obtain a single energy value associated with each section;
grouping the sections into groups, each group containing three or more sections;
assigning a nominal bit value to each group according to a bit assignment rule, the bit assignment rule based on the energy values of the sections in the group;
assigning a watermark bit value to each group;
for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;
wherein modifying one or more energy values of one or more corresponding sections in the group comprises modifying a single energy value corresponding to a single section in the group; and
wherein modifying the single energy value corresponding to the single section in the group comprises modifying the samples of the single section to distribute the modification of the single energy value of the single section evenly over the samples of the single section.

21. A method for encoding watermark information into media data containing a series of digital samples in a sample domain, the method comprising:
dividing the series of digital samples into a plurality of sections in the sample domain, each section comprising a corresponding plurality of samples;
processing the corresponding plurality of samples in each section to obtain a single energy value associated with each section;
grouping the sections into groups, each group containing three or more sections;
assigning a nominal bit value to each group according to a bit assignment rule, the bit assignment rule based on the energy values of the sections in the group;
assigning a watermark bit value to each group;
for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;
wherein modifying one or more energy values of one or more corresponding sections in the group comprises modifying a single energy value corresponding to a single section in the group; and
wherein modifying the single energy value corresponding to the single section in the group comprises modifying the samples of the single section to distribute the modification of the single energy value of the single section unevenly over the samples of the single section.

22. A method according to claim 21 wherein modifying the single energy value corresponding to the single section in the group comprises modifying the energy value of samples of the single section according to a function based on the proximity of the samples to the edges of the single section.

23. A method according to claim 22 wherein modifications performed according to the function are smaller for samples at the edges of the single section than for samples away from the edges of the single section.

24. A method for encoding watermark information into media data containing a series of digital samples in a sample domain, the method comprising:
dividing the series of digital samples into a plurality of sections in the sample domain, each section comprising a corresponding plurality of samples;
processing the corresponding plurality of samples in each section to obtain a single energy value associated with each section;
grouping the sections into groups, each group containing three or more sections;
assigning a nominal bit value to each group according to a bit assignment rule, the bit assignment rule based on the energy values of the sections in the group;
assigning a watermark bit value to each group;
for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;
wherein modifying one or more energy values of one or more corresponding sections in the group comprises modifying three or more energy values corresponding to three or more sections in the group;
wherein modifying the three or more energy values corresponding to three or more sections in the group comprises repetitively incrementally modifying at least one of the three or more energy values until satisfying a termination condition, the termination condition based on the three or more energy values; and
wherein repetitively incrementally modifying at least one of the three or more energy values comprises repetitively incrementally modifying a plurality of the energy values until satisfying one or more intermediate conditions, the one or more intermediate conditions based on two of the three or more energy values.

25. A method according to claim 24 wherein the intermediate condition comprises a condition that ensures that an incremental modification of the plurality of energy values does not cause the categorization of the group to change.

26. A method for encoding watermark information into media data containing a series of digital samples in a sample domain, the method comprising:
dividing the series of digital samples into a plurality of sections in the sample domain, each section comprising a corresponding plurality of samples;

processing the corresponding plurality of samples in each section to obtain a single energy value associated with each section;

grouping the sections into groups, each group containing three or more sections;

assigning a nominal bit value to each group according to a bit assignment rule, the bit assignment rule based on the energy values of the sections in the group;

assigning a watermark bit value to each group;

for each group, comparing the watermark bit value to the nominal bit value and, if the nominal bit value and the watermark bit value of the watermark information bit do not match, modifying one or more energy values of one or more corresponding sections in the group such that re-application of the bit assignment rule would assign the watermark bit value to the group;

wherein modifying one or more energy values of one or more corresponding sections in the group comprises modifying three or more energy values corresponding to three or more sections in the group;

wherein modifying the three or more energy values corresponding to three or more sections in the group comprises repetitively incrementally modifying at least one of the three or more energy values until satisfying a termination condition, the termination condition based on the three or more energy values; and wherein repetitively incrementally modifying at least one of the three or more energy values comprises modifying a first one of the three or more energy values when a corresponding intermediate condition is satisfied and modifying a second one of the three or more energy values regardless of whether the corresponding intermediate condition is satisfied.

27. A method according to claim 26 wherein the intermediate condition comprises a condition that ensures that an incremental modification of the first energy value does not cause the categorization of the group to change.

28. A method according to claim 1 wherein grouping the sections into groups comprises selecting groups such that each group comprises at least one section that is grouped into another group.

29. A computer program product comprising a non-transitory medium carrying computer-readable instructions which, when executed by a processor, cause the processor to carry out the method of claim 1.

30. A computer program product comprising a non-transitory medium carrying computer-readable instructions which, when executed by a processor, cause the processor to carry out the method of claim 21.

31. A method according to claim 2 wherein, for a particular group, the categorization rule comprises:

categorizing the particular group into a first shape category if the energy value of the second section is greater than an energy value of the first section and the energy value of the third section is greater than the energy values of the first and second sections;

categorizing the particular group into a second shape category if the energy value of the second section is less than an energy value of the first section and the energy value of the third section is less than the energy values of the first and second sections;

categorizing the particular group into a third shape category if the energy value of the second section is greater than an energy value of the first section and the energy value of the third section is between the energy values of the first and second sections;

categorizing the particular group into a fourth shape category if the energy value of the second section is greater than an energy value of the first section and the energy value of the third section is less than the energy values of the first and second sections;

categorizing the particular group into a fifth shape category if the energy value of the second section is less than an energy value of the first section and the energy value of the third section is between the energy values of the first and second sections; and categorizing the particular group into a sixth shape category if the energy value of the second section is less than an energy value of the first section and the energy value of the third section is greater than the energy values of the first and second sections.

32. A method according to claim 16 wherein at least one of:
the media data comprises audio data and the sample domain comprises a time domain;
the media data comprises image data and the sample domain comprises a spatial domain; and
the media data comprises video data and the sample domain comprises at least one of: a spatial domain and a time domain.

33. A method according to claim 16 wherein grouping the sections into groups comprises defining the groups to overlap one another such that the adjacent groups in the sampling domain include one or more sections in common.

34. A method according to claim 16 wherein the corresponding plurality of samples in each section is equal and wherein processing the corresponding plurality of samples in each section includes, for each section, integrating values of the corresponding plurality of samples in the section to obtain the energy value without performing a division operation.

35. A method according to claim 16 wherein assigning the nominal bit value to each group according to the bit assignment rule comprises:

categorizing each group into one of a plurality of categories according to a categorization rule; and for each category, assigning a nominal zero bit value or a nominal one bit value to each group according to a unique category bit assignment rule associated with the category.

36. A method according to claim 35 wherein, for each category, the corresponding category bit assignment rule is based on the relative differences between the energy values of the sections.

37. A method according to claim 35 wherein each group comprises an ordered plurality of three or more sections, wherein first and second sections are adjacent to one another in the sample domain and a third section is adjacent to the second section in the sample domain, but spaced apart from the first section in the sample domain.

38. A computer program product comprising a non-transitory medium carrying computer-readable instructions which, when executed by a processor, cause the processor to carry out the method of claim 16.

39. A method according to claim 15 wherein assigning the nominal bit value to each group according to the bit assignment rule comprises:

categorizing each group into one of a plurality of categories according to a categorization rule; and for each category, assigning a nominal zero bit value or a nominal one bit value to each group according to a unique category bit assignment rule associated with the category.

40. A method according to claim 9 wherein each group comprises an ordered plurality of three or more sections, wherein first and second sections are adjacent to one another in the sample domain and a third section is adjacent to the second section in the sample domain, but spaced apart from the first section in the sample domain.

41. A method according to claim 40 wherein the categorization rule is based on: the energy value of the first section relative to the energy value of the second section; and the energy value of the third section relative to the energy values of the first and second sections.

42. A method according to claim 1 wherein at least one of:
- the media data comprises audio data and the sample domain comprises a time domain;
- the media data comprises image data and the sample domain comprises a spatial domain; and
- the media data comprises video data and the sample domain comprises at least one of: a spatial domain and a time domain.

43. A method according to claim 31 wherein:
- for the first and second shape categories, the category bit assignment rule assigns a first bit value where a magnitude of a first slope between the energy values of the first and second sections is greater than a magnitude of a second slope between the energy values of the second and third sections and assigns a second bit value where the magnitude value of the first slope is less than the magnitude of the second slope;
- for the third and fifth shape categories, the category bit assignment rule assigns a first bit value where a magnitude of a second slope between the energy values of the second and third sections is greater than one half of a magnitude of a first slope between the first and second energy values and assigns a second bit value where the magnitude of the second slope is less than one half of the magnitude of the first slope; and
- for the fourth and sixth shape categories, the category bit assignment rule assigns a first bit value where a magnitude of a second slope between the energy values of the second and third sections is greater than twice a magnitude of a first slope between the first and second energy values and assigns a second bit value where the magnitude of the second slope is less than twice the magnitude of the first slope.

* * * * *